United States Patent
Lin et al.

(10) Patent No.: US 11,520,783 B2
(45) Date of Patent: Dec. 6, 2022

(54) AUTOMATED VALIDITY EVALUATION FOR DYNAMIC AMENDMENT

(71) Applicant: International Business Machines Corporation, Armonk, NY (US)

(72) Inventors: Chen Lin, Elmsford, NY (US); John Rofrano, Mahopac, NY (US); Anup Kalia, Elmsford, NY (US); Maja Vukovic, New York, NY (US); Jinho Hwang, Ossining, NY (US); Jie Ma, Beijing (CN); Lijun Mei, Beijing (CN); Ya Bin Dang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 16/575,916

(22) Filed: Sep. 19, 2019

(65) Prior Publication Data

US 2021/0089528 A1  Mar. 25, 2021

(51) Int. Cl.
*G06F 16/2452* (2019.01)
*G06F 16/242* (2019.01)
*G06F 40/253* (2020.01)
*G06N 3/08* (2006.01)

(52) U.S. Cl.
CPC .... *G06F 16/24522* (2019.01); *G06F 16/2443* (2019.01); *G06F 16/24524* (2019.01); *G06F 40/253* (2020.01); *G06N 3/08* (2013.01)

(58) Field of Classification Search
CPC ........... G06F 16/24522; G06F 16/2443; G06F 16/24524; G06F 40/253; G06N 3/08
See application file for complete search history.

(56) References Cited

U.S. PATENT DOCUMENTS

| | | | |
|---|---|---|---|
| 9,495,395 B2 | 11/2016 | Chan et al. | |
| 9,692,662 B2 | 6/2017 | Chan et al. | |
| 2015/0074034 A1* | 3/2015 | Ait-Mohktar | G06F 16/835 706/50 |
| 2018/0018971 A1* | 1/2018 | Park | G10L 17/04 |

(Continued)

OTHER PUBLICATIONS

Kandi, Language Modelling for Handling Out-of-vocabulary Words in Natural Language Processing, Thesis, Aug. 2018, (Year: 2018).*

(Continued)

*Primary Examiner* — Sonia L Gay
(74) *Attorney, Agent, or Firm* — Lieberman & Brandsdorfer, LLC

(57) ABSTRACT

A system, program product, and method for use with an artificial intelligence (AI) platform to dynamically amend a knowledge base responsive to query evaluating and processing. A received or detected query is subject to natural language processing to identify, annotate, and map one or more query tokens against a knowledge base. The query tokens are evaluated against the knowledge base to identify one or more query tokens absent from the knowledge base and leverage a neural network to predict a probability relationship between the query tokens absent from the knowledge base and one or more tokens populated in the knowledge base. The natural language (NL) query is translated to a structured query language (SQL) and the SQL query is executed and evaluated, and the knowledge base is selectively and dynamically amended subject to the SQL evaluation.

17 Claims, 7 Drawing Sheets

(56) References Cited

U.S. PATENT DOCUMENTS

2018/0060301 A1 3/2018 Li et al.
2020/0004831 A1* 1/2020 Burceanu .............. G06F 40/253

OTHER PUBLICATIONS

Shah et al., Optimizing Natural Language Interface for Relational Database, International Journal of Engineering and Advanced Technology, ISSN 2249-8958, Apr. 2019 (Year: 2019).*
Zhong, V., et al., "Seq2SQL: Generating Structured Queries From Natural Language Using Reinforcement Learning", arXiv:1709.00103v7, Nov. 9, 2017.
Yu, T., et al., "TypeSQL: Knowledge-based Type-Aware Neural Text-to-SQL Generation", arXiv:1804.09769v1, Apr. 25, 2018.
Zhao, Tiancheng, "Learning Generative End-to-end Dialog Systems with Knowledge", Language Technologies Institute, School of Computer Science, Carnegie Mellon University, Nov. 21, 2017.
Anonymous, "Predicting Search Queries Based on Personal Routines", Jan. 5, 2018.
Anonymous, "Reinforcement Learning for Fuzzing Testing Techniques", Dec. 13, 2017.

* cited by examiner

AUTOMATED VALIDITY EVALUATION FOR DYNAMIC AMENDMENT

BACKGROUND

The present embodiments relate to an artificial intelligence (AI) platform and natural language processing (NLP) to translate a natural language (NL) query to structured query language (SQL). More specifically, the embodiments are directed to reinforcement learning to support dynamic and automatic expansion of a corresponding knowledge base.

In the field of artificially intelligent computer systems, natural language systems (such as the IBM Watson® artificially intelligent computer system or other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial Intelligence (AI), utilizes algorithms to learn from and create foresights based on this data. AI refers to the intelligence when machines based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures, such as databases, are inherently subject to change, and the output or action may be subject to change accordingly, particularly in the environment of a conversational agent. Solutions for efficiently understanding natural language (NL) and processing content in response to the identification and understanding, as well as changes to the structures, are extremely difficult at a practical level.

SUMMARY

The embodiments include a system, computer program product, and method for processing a user query, evaluating a structured query language (SQL) query, and dynamically amending a knowledge base.

In one aspect, a computer system is provided with a processing unit operatively coupled to memory and an artificial intelligence (AI) platform. The AI platform includes tools in the form of a query manager, an evaluator, a translation manager, an SQL manager, and a knowledge base manager. The query manager functions to pre-process a natural language (NL) query, the pre-processing includes the query manager to identify one or more query tokens from a NL query, annotate a part-of-speech tag of one or more of the identified query tokens, and map the annotated one or more identified query tokens against a knowledge base. The evaluator, operatively coupled to the query manager, is provided to assess the pre-processed query tokens against the knowledge base, including identify one or more query tokens absent from the knowledge base, and leverage a neural network to predict a probability of a relationship between the query tokens absent from the knowledge base and one or more tokens populated in the knowledge base. The translation manager, which is operatively coupled to the evaluator, functions to convert the NL query to a SQL, including selectively incorporating the query tokens absent from the knowledge base into the query responsive to the predicted probability. The SQL manager, operatively coupled to the translation manager, is provided to execute the SQL and evaluate validity of the executed SQL, and a knowledge base manager, operatively coupled to the SQL manager, dynamically amends the knowledge base responsive to the validity evaluation.

In another aspect, a computer program product interprets and manages an executable codified infrastructure. The computer program product includes a computer readable storage medium having program code embodied therewith. Program code, which is executable by a processor, is provided to pre-process a NL query, including identify one or more query tokens, annotate a part-of-speech tag of the identified one or more query tokens, and map the identified one or more query tokens against a knowledge base. Program code is further provided to evaluate the query tokens against the knowledge base, including identify one or more query tokens absent from the knowledge base and leverage a neural network to predict a probability of a relationship between the query tokens absent from the knowledge base and one or more tokens populated in the knowledge base. Program code is provided to translate the NL query to a SQL, including selectively incorporate the query tokens absent from the knowledge base into the query responsive to the predicted probability. Program code is further provided to execute the SQL and evaluate validity of the executed SQL, and dynamically amend the knowledge base responsive to the validity evaluation.

In yet another aspect, a method is provided for pre-processing a NL query, including identify one or more query tokens, annotate a part-of-speech tag of one or more identified query tokens, and map the annotated one or more identified query tokens against a knowledge base. The method further provides evaluating the query tokens against the knowledge base, including identifying one or more query tokens absent from the knowledge base, and leveraging a neural network to predict a probability of a relationship between the query tokens absent from the knowledge base and one or more tokens populated in the knowledge base. The NL query is translated to SQL, with the translation including selectively incorporating the query tokens absent from the knowledge base into the query responsive to the predicted probability. The method further provides executing the SQL and evaluating validity of the executed SQL, and dynamically amending the knowledge base in response to the validity evaluation.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
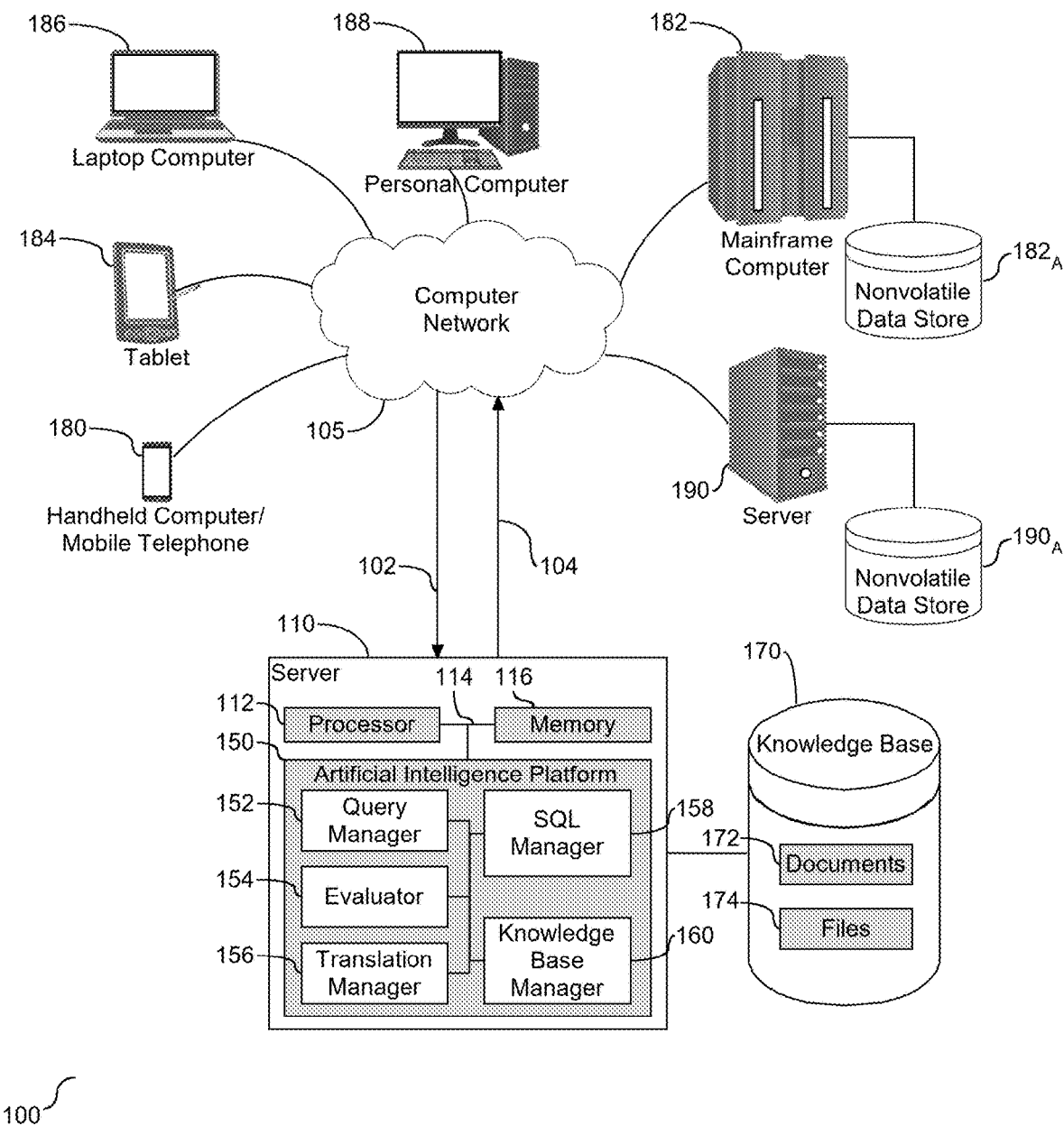
FIG. 1 depicts a system diagram illustrating a schematic diagram of a computer system to provide reinforcement learning to support dynamic and automatic expansion of a corresponding knowledge base (KB).

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A conversational agent using artificial intelligence (AI) is designed to imitate a human and uses various natural language (NL) techniques to interpret a query and generate a proper response. Conversational agents can be used to promote products, provide assistance, conduct surveys, and serve as entertainment. Shortcomings of conversational agents include the difficulty of efficiently designing an agent that meets a user's expectations, and dynamically updating an existing knowledge base with answers to questions not present therein. The latter shortcoming may be due to at least one of unavailable data elements, inconsistent vocabulary, unknown domain knowledge, and system design issues. Accordingly, there is a need to provide a conversational agent having a knowledge base capable of dynamic amendment to effectively and efficiently respond to queries.

Computational linguistics is the application of computer science to analysis, synthesis and comprehension of written and spoken language. A computational understanding of language provides insight into substantive aspects of linguistic elements in underlying texts, and improves the relationship between computer commands and language. The embodiments described herein relate to integrating queries and corresponding query results with contextual analysis. In one embodiment, a neural network and associated computational models identify complex relationships and patterns for dynamically amending an existing knowledge base using an automated validity determination. Accordingly, as described in detail herein, an AI platform is employed to identify such relationships, and to dynamically transform queried information into expansion of the knowledge base.

Referring to FIG. 1, a schematic diagram of a computer system (100) is depicted to provide reinforcement learning to support dynamic and automatic expansion of a corresponding knowledge base. As shown, a server (110) is provided in communication with a plurality of computing devices (180), (182), (184), (186), (188), and (190) across a network connection (105). The server (110) is configured with a processor or processing unit (112) in communication with memory (116) across a bus (114). The server (110) is shown with an artificial intelligence (AI) platform (150) configured to support and enable AI for amending a knowledge base (KB) (170). As shown, computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable processing of context for one or more content users. Other embodiments of the server (110) may be used with components, systems, sub-systems, and/or devices other than those that are depicted herein.

The AI platform (150) may be configured to receive input from various sources. For example, the AI platform (150) may receive input across the network (105), one or more knowledge bases or corpora (170) of electronic documents (172) or files (174), or other data, content users, and other possible sources of input. In one embodiment, KB (170), also referred to herein as a corpus, may include structured, semi-structured, and/or unstructured content in a plurality of documents that are contained in one or more large knowledge databases or corpora. The various computing devices (180), (182), (184), (186), (188), and (190) in communication with the network (105) may include access points for content creators and content users to the KB (170). Some of the computing devices may include devices for a database storing the corpus of data as the body of information used by the AI platform (150), and to process the corpus of data on context, thereby enhancing AI, and in one embodiment natural language processing (NLP), based services. The network (105) may include local network connections (102) and (104) and remote connections in various embodiments, such that the AI platform (150) may operate in environments of any size, including local and global, e.g. the Internet.

As shown, content may be in the form of one or more electronic documents (172) or files (174) for use as part of the corpus (170) of data. The corpus (170) may include any structured and unstructured documents, including but not limited to any file, text, article, or source of data (e.g. scholarly articles, dictionary, definitions, encyclopedia references, and the like) for use by the AI platform (150). Content users may access the AI platform (150) via a network connection or an internet connection to the network (105), and may submit NL input to the AI platform (150) that, in one embodiment, may effectively be processed into context-based word vector representation.

As shown, the AI platform (150) is local to the server (110). In some illustrative embodiments, the server (110) may be the IBM Watson® system available from International Business Machines Corporation of Armonk, N.Y., which is augmented with the mechanisms of the illustrative embodiments described hereafter. As shown, the server (110) includes the AI platform (150), which utilizes tools in the form of a query manager (152), an evaluator (154), a translation manager (156), a structured query language (SQL) manager (158), and a knowledge base (KB) manager (160). Though shown as being embodied in or integrated with the server (110), the tools may be implemented in a separate server (e.g., 190) that is connected across network (105) to the server (110). Wherever embodied, the query manager (152), evaluator (154), translation manager (156), SQL manager (158), and KB manager (160) function to provide and assess contextual analysis of a query for dynamically amending the KB (170).

The query manager (152) functions to pre-process, or in one embodiment process, a natural language (NL) query. More specifically, the query manager (152) identifies one or more tokens present in the query and annotates a part-of-speech tag of the identified tokens. For example, a received or detected query can include a question that includes words corresponding to different parts-of-speech. Examples of parts-of-speech that are subject to recognition include, but are not limited to, noun, pronoun, verb, adjective, adverb, preposition, conjunction, interjection, and article. The query manager (152) separates the query and corresponding query elements into meaningful segments or tokens and identifies parts-of-speech associated with the tokens. In one embodiment, the query manager (152) is limited to a select subset of the parts-of-speech, such as nouns, verbs, and adjectives, although this quantity and selection should not be considered limiting. Accordingly, the query manager (152) is configured to receive or detect a NL query, and subject the query to NL processing, including identification of at least a subset of parts-of-speech.

Once identified, the tagged tokens are annotated in subject, predicate, object (SPO) triples according to any suitable standard, such as W3C Resource Description Framework (RDF) standard. In one embodiment, the annotation optionally includes labeling objects and subjects collectively as "entities" and predicates as "relations". A relation describes a correlation between subject and object, and, in one embodiment, classifies the subject and object as equivalence and hyponymy. Accordingly, the query manager (152) represents query tokens in the form of binary relationships, and in particular SPO triples, wherein subject and object are entities and predicate is the relation between them.

The query manager (152) maps the annotated one or more query tokens against a KB (170). Particularly, the query manager (152) links the annotated query tokens against previously tagged and annotated tokens stored in the KB (170). These previously stored tokens are inputted during the creation of the KB (170) or dynamically added thereafter, as discussed below. The mapping effectively matches annotated query tokens with annotated KB tokens. Accordingly, the query manager (152) subjects the query to pre-processing with respect to tokens present and populated in the KB (170).

As shown, the evaluator (154) is operatively coupled to the query manager (152). The evaluator (154) measures the pre-processed query tokens against the KB (170). More specifically, the evaluator (154) identifies any query tokens that are not present, e.g. absent or missing, in the KB (170). For each of the absent or missing query tokens, the evaluator (154) leverages a neural network to predict a probability of a relationship between the absent or missing query tokens and one or more tokens populated in the KB (170).

Figure 2:
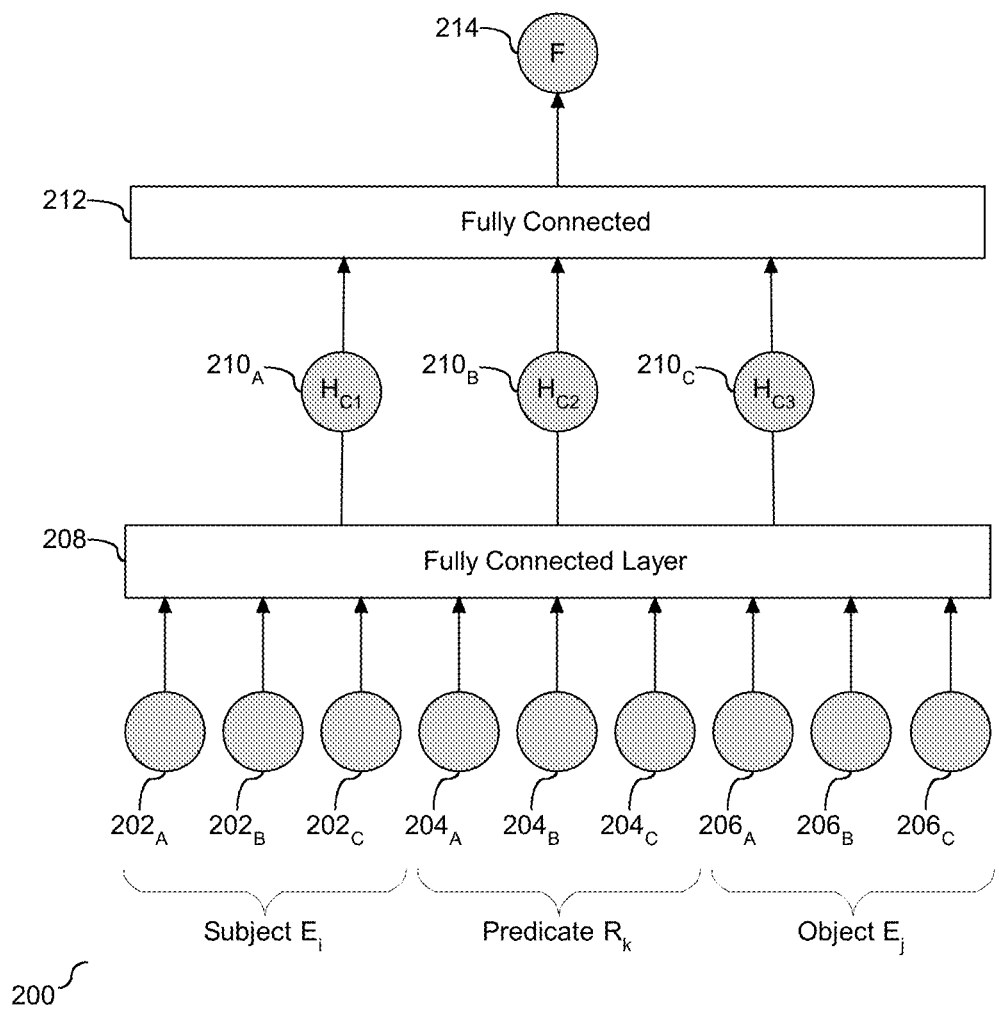
FIG. 2 depicts a diagram of a neural network for predicting probability relationships between query tokens.

Referring to FIG. 2, an exemplary neural network (200) leveraged for detecting predictability is depicted with two fully connected layers (208) and (212). Each token $(202_A)$-$(206_C)$ is translated to a vector. The evaluator (154) generates word vectors for the identified context using a word vector generation model. The evaluator (154) creates a composite representation of the annotated query tokens in the first layer (208). As shown in this example, pre-processed query tokens are segregated into at least one of one or more subjects $(202_{A-C})$, one or more predicates $(204_{A-C})$, and one or more objects $(206_{A-C})$, e.g. subject-predicate-objects (SPOs), although any number of SPOs may be utilized. The following formula is employed to represent a composite concatenation of a hidden SPOs:

$$\varnothing_{ijk}^{ER-MLP} := [e_i; e_j; r_k]$$

where $e_i$ represents the subject(s), $e_j$ represents the object(s), $r_k$ represents the predicate(s), and ER-MLP represents a model based on multi-layer perceptrons (MLP) with an embedding of the entities and relations (ER).

The composite representation is shown in the next layer (212) of the neural network (200) in condensed representation. The concatenated output vector for the identified query tokens at the layer (208) are ingested at the adjacent layer (212). In one embodiment, the generated vectors may be stored in the knowledge base (170) or local to the server (110) as depicted in FIG. 1. If entities are not present in KB (170), a determination of probability is made whether to include the entities.

The evaluator (154) assesses the interaction $(210_{A-C})$ between the tokens and different token combinations in the second layer (212). The interaction $(210_{A-C})$ is represented in the second layer (212) as condensed representation of the vectors. The interaction between the SPO $(210_{A-C})$ is determined by the following formula:

$$h_{ijk}^C := C^T \varnothing_{ijk}^{ER-MLP}$$

Output from the model (214) represents a probability indicating a missing token from the query should be added to the knowledge base (170). This probability is determined by the formula:

$$f_{ijk}^{ER-MLP} := w^T g(h_{ijk}^c)$$

In one embodiment, a threshold is applied with respect to the probability output from the model to indicate if the missing token(s) should be added to the knowledge base (170). For example, in one embodiment, the probability output value ranges from 0 to 1 with values being greater than or equal to 0.5 indicating that the probability threshold has been attained.

As shown in FIG. 1, the translation manager (156) is operatively coupled to the query manager (152) and the evaluator (154). The translation manager (156) functions to translate the NL query to a structured query language (SQL), including selectively incorporating the query tokens absent from the knowledge base (170) into the query responsive to a predicted probability assessment, as depicted in FIG. 2. The output from the neural network (200) generates a prediction corresponding to adding the missing tokens to the knowledge base (170), as discussed above.

The SQL manager (158), operatively coupled to the translation manager (156), executes the SQL and evaluates validity of the executed SQL. In one embodiment, a valid SQL generates a positive signal and an invalid SQL generates a negative signal. As shown, the KB manager (160) is also operatively coupled to the SQL manager (158). The KB manager (160) interfaces with the KB (170), and dynamically amends the KB (170) responsive to receipt of a signal, e.g. a positive signal. The KB (170) amendment includes adding the missing or absent tokens from the query to the KB (170). The validity evaluation is a reward determination, as hereinafter described. The SQL manager (158) generates a signal from the reward determination, and further amends the one or more identified query tokens with signal metadata with the reward determination. The evaluator (154) appraises validity of the executed SQL, which includes appraising signal metadata. The KB manager (160) dynamically amends the KB (170) responsive to the validity evaluation communicated by the SQL manager (158) to include selectively adding the identified query tokens to the KB (170) based on a corresponding reward value of the signal metadata. In one embodiment, a positive signal is communicated to the KB manager (160) to amend the weight(s) in the neural network, after which the KB manager (160) re-trains the neural network (200) with the one or more selectively added query tokens, as hereinafter described. Accordingly, the selectively added query tokens create ground truth or objectively provable data.

As shown, the AI platform (150) employs a plurality of tools, e.g. sub-engines, to support application of NLP for context identification and application, including the query manager (152), the evaluator (154), the translation manager (156), the SQL manager (158), and the KB manager (160). The functionality of each tool is shown and described herein. Together, the tools (152)-(160) identify and process one or more queries to dynamically and selectively amend the KB (170). Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using a computer network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

Figure 3:
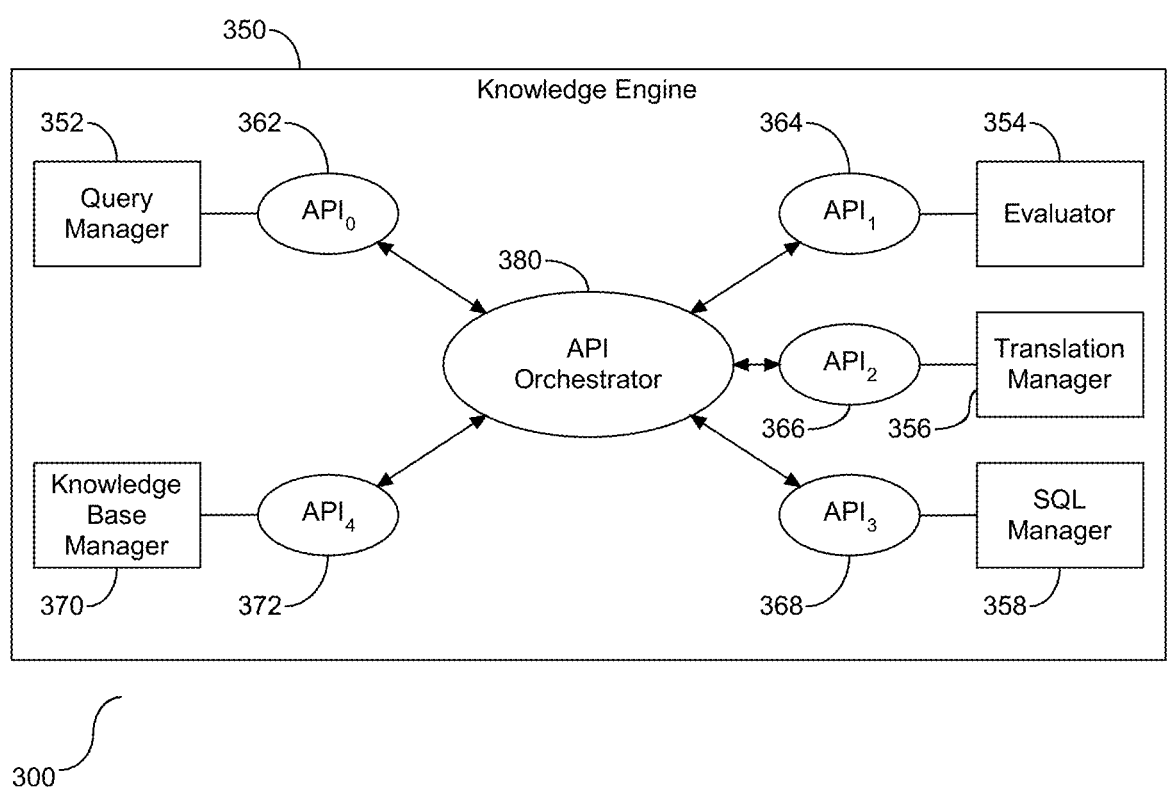
FIG. 3 depicts a block diagram illustrating the tools shown in FIG. 1 and their associated application program interfaces (APIs).

An Application Program Interface (API) is understood in the art as a software intermediary between two or more applications. With respect to the AI platform (150) shown and described in FIG. 1, one or more APIs may be utilized to support one or more of the tools (152)-(160) and their associated functionality. Referring to FIG. 3, a block diagram (300) is provided illustrating the tools (152)-(160) shown and described in FIG. 1 and their associated APIs. As shown, a plurality of tools are embedded within the AI platform (350), comparable to AI platform (150) shown in FIG. 1, with the tools including the query manager (352) associated with API$_0$ (362), the evaluator (354) associated with API$_1$ (364), the translation manager (356) associated with API$_2$ (366), the SQL manager (358) associated with API$_3$ (368), and the KB manager (370) associated with API$_4$ (372). Each of the APIs may be implemented in one or more languages and interface specifications. API$_0$ (362) provides functional support to identify and map NL query tokens; API$_1$ (364) provides functional support to identify one or more query tokens absent from the KB, leverage a neural network to predict a probability, and further appraise the validity of the executed SQL; API$_2$ (366) provides functional support to translate the NL query to SQL; API$_3$ (368) provides functional support to execute the SQL and evaluate the validity of the executed SQL; and API$_4$ (372) provides functional support for dynamic and selective amendment of the KB. As shown, each of the APIs (362), (364), (366), (368), and (372) are operatively coupled to an API orchestrator (380), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
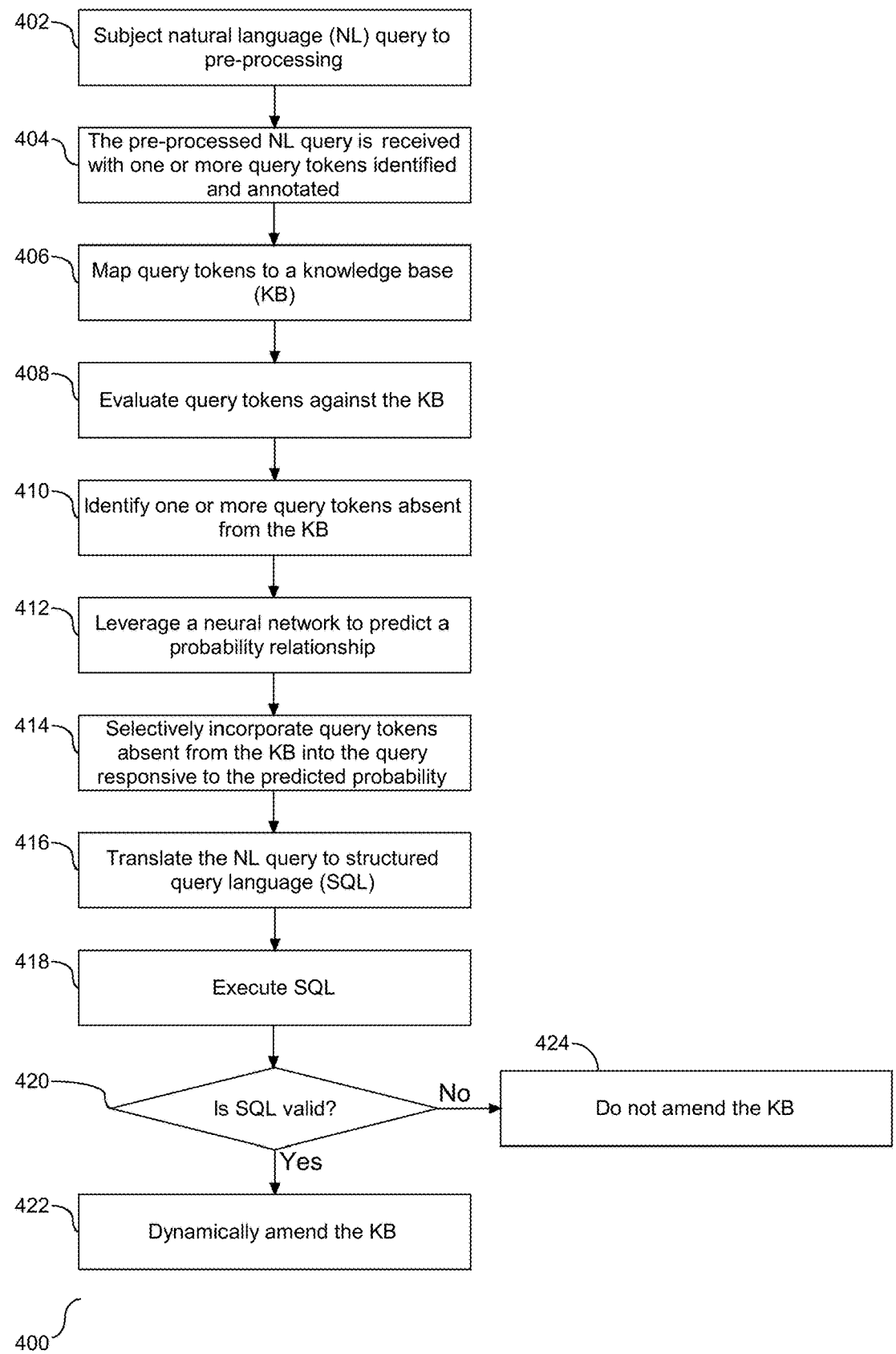
FIG. 4 depicts a flow chart illustrating a process for dynamically amending the KB from a natural language (NL) query responsive to the validity evaluation.

Referring to FIG. 4, a flow chart (400) is provided to illustrate a process for dynamically and selectively amending a KB responsive to evaluate query tokens absent from the KB. As shown, a NL query is subject to pre-processing to identify one or more tokens present in the query and annotating a part-of-speech tag of the identified tokens (402). The pre-processed NL query is received with one or more query tokens identified and annotated (404). The query tokens are mapped to the KB (406), and subject to evaluation against the KB (408). As shown herein, one or more tokens present in the received query but absent from the KB are identified (410). It is understood in the art that in one embodiment there may not be any absent or missing query tokens. A neural network is leveraged to assess and predict a probability relationship between the missing tokens and the KB tokens (412). Following step (412), query tokens absent from KB are selectively incorporated into the query responsive to the predicted probability (414). Afterwards, the NL query is translated to SQL (416) and executed (418). The executed SQL is evaluated (420) for validity of the query. In one embodiment, execution of the SQL creates or generates a corresponding signal, with a positive signal identifying a valid SQL and a negative signal identifying an invalid SQL. The KB is selectively and dynamically amended responsive to a positive validity evaluation (422). Similarly, a negative signal results in an SQL query not being added to the KB (424), e.g. the KB is not subject to amendment. Accordingly, queries are utilized for selectively and dynamically amending the KB.

As shown and described in FIG. 4 a signal is generated with the SQL execution. In one embodiment, the signal is an assessed or calculated value, which can be compared to a reward threshold. As an example in one embodiment, a range of the reward signal can be normalized from 0.1-0.9, and any values of at least 0.5 can be a positive reward signal and any values less than 0.5 can be a negative reward signal. The positive or negative reward values can be attached to an SQL token as metadata and communicated back to the knowledge base manager (160). If the reward signal is positive, the KB (170) is amended, optionally online. If the reward signal is negative or otherwise does not exceed the threshold, then the generated token value is not added to the KB (170), and in one embodiment an error message may be presented. In one embodiment, the SQL response, e.g. signal, is communicated to the query user before adding the token value to the KB. If the user indicates that the SQL response is invalid or wrong, a negative signal is communicated and the generated SQL token value is not added to the KB (170), and in one embodiment, the neural network weights are not altered. If the signal meets or exceeds the threshold, the neural network weights are altered and the corresponding neural network is re-trained. Accordingly, the reward signal selectively and dynamically integrates SQL tokens into the KB (170) and subjects the corresponding neural network to re-training.

Embodiments shown and described herein may be in the form of a computer program device for use with an intelligent computer platform in order to support dynamic and automatic expansion of a corresponding knowledge base. The device has program code embodied therewith. The program code is executable by a processing unit to execute the functionality of the tools of the AI platform (150), e.g. query manager (152), evaluator (154), translation manager (156), SQL manager (158), and KB manager (160). Aspects of the functional tools, e.g. query manager, translation manager, evaluator, SQL manager, and KB manager, and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in a cloud computing environment (510), to implement the system, tools, and processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (560) where tasks are performed by remote processing devices that are linked through a communications network. In a distributed cloud computing environment, program modules may be located in both local and remote computer system storage media including memory storage devices.

Figure 5:
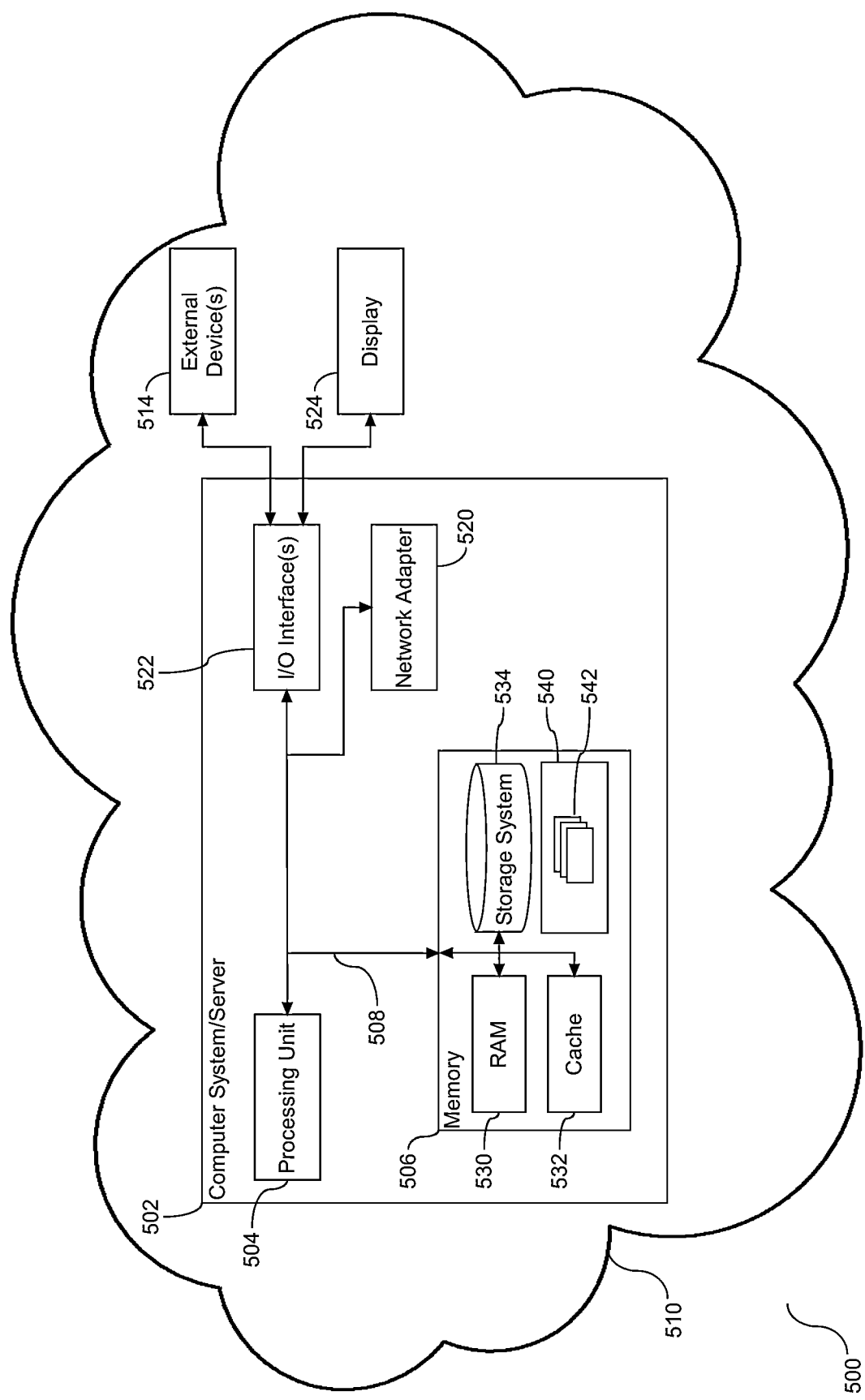
FIG. 5 depicts a block diagram illustrating an example of a computer system/server of a cloud based support system, to implement the system and process described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (512) and/or cache memory (514). By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments supported by the AI platform (150) and the tools (152)-(160). For example, the set of program modules (520) may include the modules configured as the query manager, evaluator, translation manager, SQL manager, and KB manager as described in FIGS. 1-4.

Host (502) may also communicate with one or more external devices (540), such as a keyboard, a pointing device, etc.; a display (550); one or more devices that enable a user to interact with host (502); and/or any devices (e.g., network card, modem, etc.) that enable host (502) to communicate with one or more other computing devices. Such communication can occur via Input/Output (I/O) interface(s) (510). Still yet, host (502) can communicate with one or more networks such as a local area network (LAN), a general wide area network (WAN), and/or a public network (e.g., the Internet) via network adapter (530). As depicted, network adapter (530) communicates with the other components of host (502) via bus (508). In one embodiment, a plurality of nodes of a distributed file system (not shown) is in communication with the host (502) via the I/O interface (510) or via the network adapter (530). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (512), cache (514), and storage system (516), such as a removable storage drive and a hard disk installed in a hard disk drive.

Computer programs (also called computer control logic) are stored in memory (506). Computer programs may also be received via a communication interface, such as network adapter (530). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
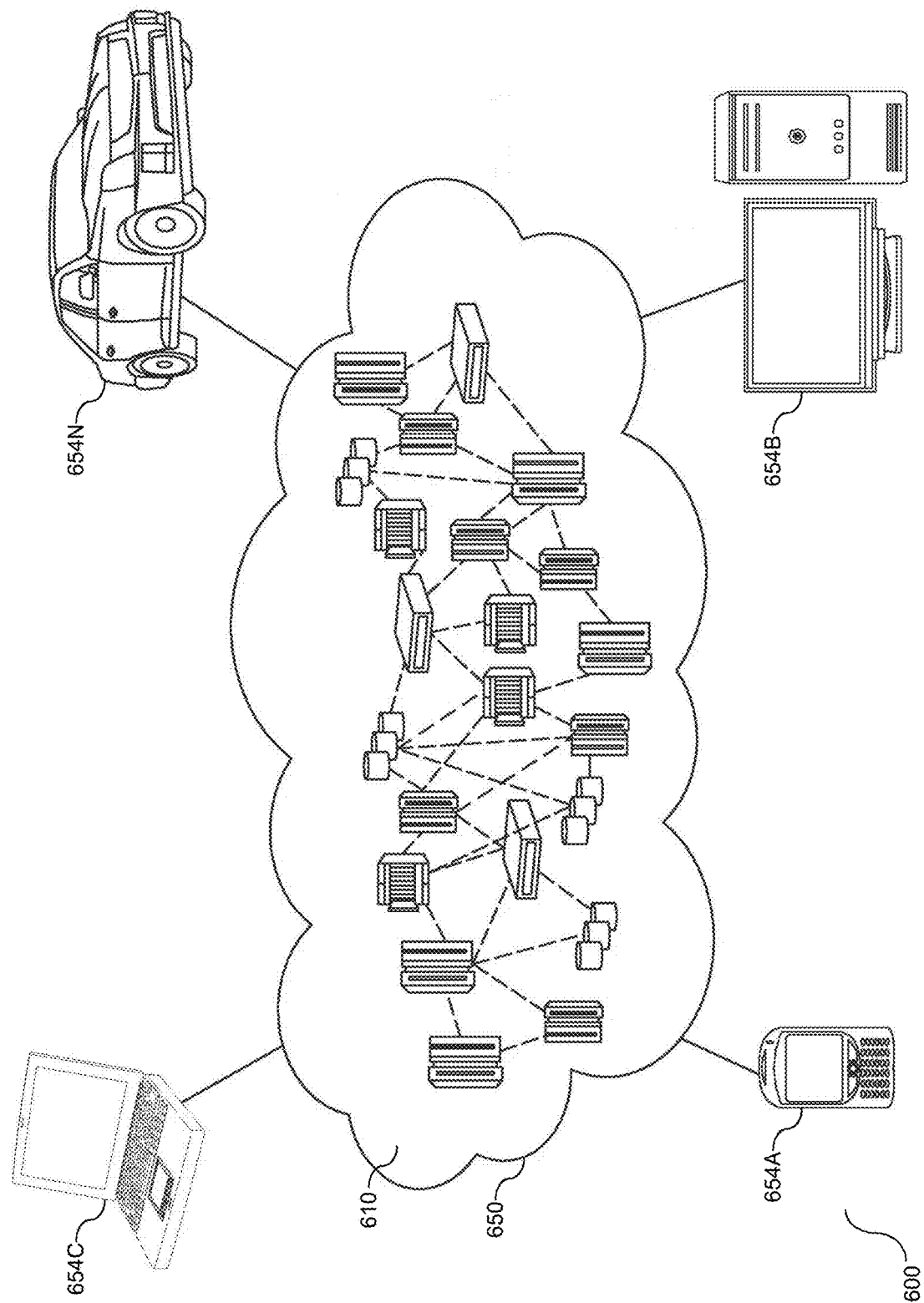
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
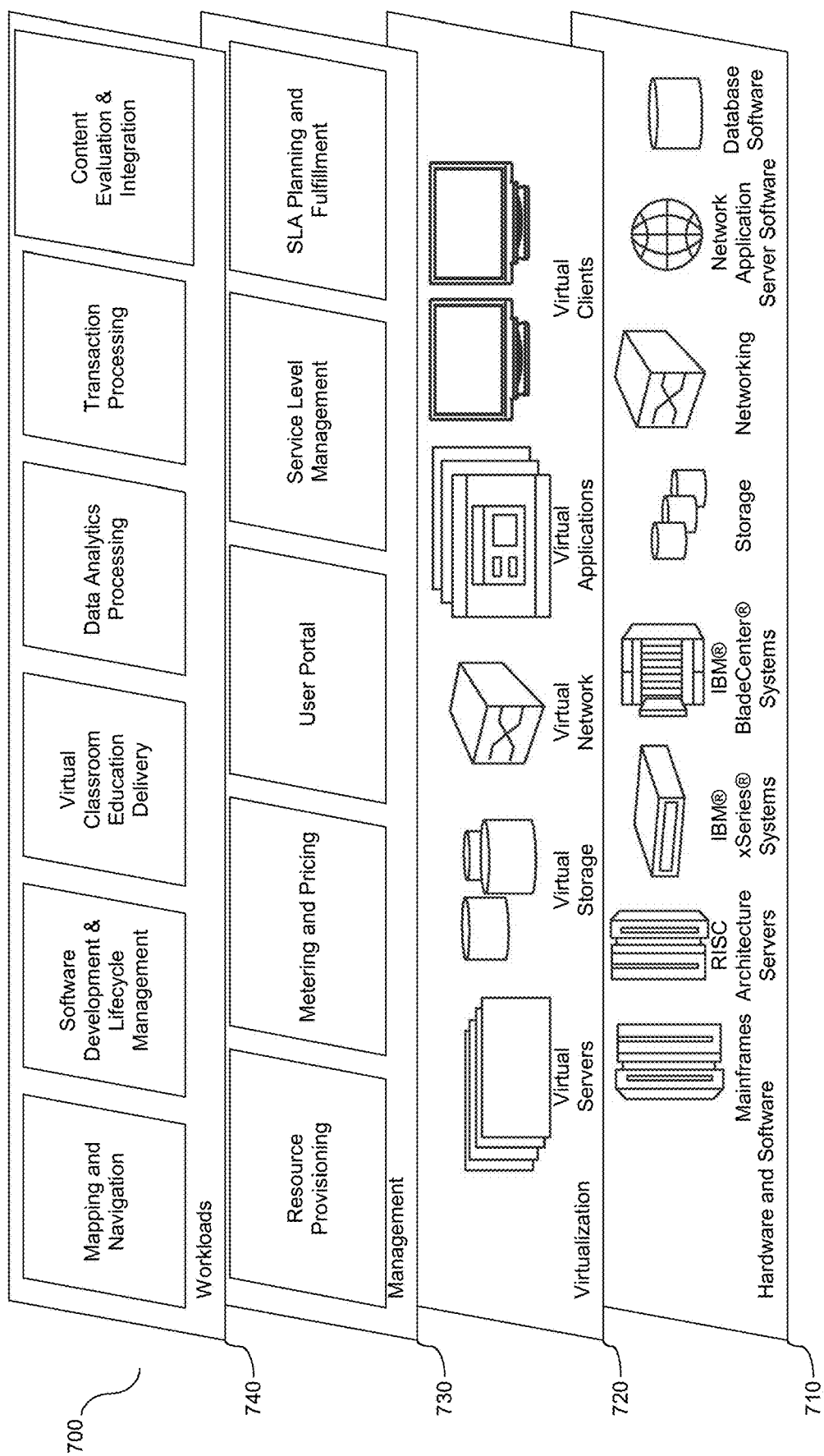
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and content evaluation and integration.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product. In addition, selected aspects of the present embodiment may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiment may take the form of computer program product embodied in a computer readable storage medium (or media) having computer readable program instructions thereon for causing a processor to carry out aspects of the present embodiment. Thus embodied, the disclosed system, a method, and/or a computer program product are operative to dynamically amend a knowledge base responsive to a validity evaluation.

Aspects of the present embodiment are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the leverage of context into the word and document vector representations and associated vector modeling provides context sensitivity with respect to sentence and/or key word identification.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

It will be appreciated that, although specific embodiments have been described herein for purposes of illustration, various modifications may be made without departing from the spirit and scope of the embodiments. In particular, the context identification shown and described herein may be identified dynamically over a period of time and used for amending KB. Accordingly, the scope of protection of the embodiments is limited only by the following claims and their equivalents.

What is claimed is:

1. A computer system comprising:
a processing unit operatively coupled to memory; and
an artificial intelligence (AI) platform operatively coupled to the processing unit, including:
a query manager configured to pre-process a natural language (NL) query, including to:
annotate a part-of-speech tag of one or more identified query tokens, and
map the annotated one or more identified query tokens against a knowledge base;
an evaluator, operatively coupled to the query manager, configured to assess the identified query tokens against the knowledge base, including:
identify one or more query tokens absent from the knowledge base; and
leverage a neural network to predict a probability of a relationship between the query tokens absent from the knowledge base and one or more tokens populated in the knowledge base;
a translation manager, operatively coupled to the evaluator, configured to convert the NL query to a structured query language (SQL), including selectively incorporate the query tokens absent from the knowledge base into the NL query responsive to the predicted probability;
an SQL manager, operatively coupled to the translation manager, configured to execute the SQL and evaluate validity of the executed SQL; and
a knowledge base manager configured to dynamically amend the knowledge base responsive to the validity evaluation.

2. The system of claim 1, wherein leveraging the neural network further comprises the evaluator being configured to:
create a composite representation of the annotated query tokens in a first layer of the neural network, concatenate an output vector for the composited query tokens, and input the concatenated query tokens at a second layer of the neural network;
assess interaction between the tokens and different token combinations in the second layer of the neural network; and
identify a probability of a relationship of the query tokens to one or more knowledge base tokens.

3. The system of claim 2, wherein the IT manager is further configured to generate a signal from the executed SQL and amend the one or more identified query tokens with signal metadata.

4. The system of claim 3, wherein the evaluator is further configured to appraise the signal metadata, and the knowledge base manager is further configured to selectively add the identified query tokens to the knowledge base based on a corresponding value of the signal metadata, wherein the selectively added query tokens creates ground truth data.

5. The system of claim 4, wherein the knowledge base manager is further configured to re-train the neural network with the one or more selectively added query tokens, wherein output from the neural network generates a prediction corresponding to retaining the one or more selectively added tokens in the knowledge base.

6. A computer program product to interpret and manage an executable codified infrastructure, the computer program product comprising:
a computer readable storage medium having program code embodied therewith, the program code executable by a processor to:
pre-process a natural language (NL) query, including annotate a part-of-speech tag of one or more identified query tokens, and map the identified one or more query tokens against a knowledge base;
evaluate the identified query tokens against the knowledge base, including identify one or more query tokens absent from the knowledge base, and leverage a neural network to predict a probability of a relationship between the query tokens absent from the knowledge base and one or more tokens populated in the knowledge base;
translate the NL query to a structured query language (SQL), including selectively incorporate the query tokens absent from the knowledge base into the NL query responsive to the predicted probability;
execute the SQL and evaluate validity of the executed SQL; and
selectively and dynamically amend the knowledge base responsive to the validity evaluation.

7. The computer program product of claim 6, wherein the program code to leverage the neural network further comprises program code executable by the processor to:
- create a composite representation of the identified query tokens in a first layer of the neural network, concatenate an output vector for the identified query tokens, and input the concatenated identified query tokens at a second layer of the neural network;
- assess interaction between the tokens and assess different token combinations in the second layer of the neural network; and
- identify a probability of a relationship of the query tokens to one or more knowledge base tokens.

8. The computer program product of claim 7, wherein execution of the SQL generates a signal, and further comprising program code executable by the processor to amend the one or more identified query tokens with signal metadata.

9. The computer program product of claim 8, wherein evaluation of validity of the executed SQL includes program code executable by the processor to evaluate signal metadata, and wherein the dynamic amendment of the knowledge base responsive to the validity evaluation includes program code executable by the processor to selectively add the identified query tokens to the knowledge base based on a corresponding value of the signal metadata, wherein the selectively added query tokens creates ground truth data.

10. The computer program product of claim 9, further comprising program code executable by the processor to re-train the neural network with the one or more selectively added query tokens, wherein output from the neural network generates a prediction corresponding to retaining the one or more selectively added tokens in the knowledge base.

11. A method, comprising:
- pre-processing a natural language (NL) query, including annotating a part-of-speech tag of one or more identified query tokens, and mapping the annotated one or more identified query tokens against a knowledge base;
- evaluating the query tokens against the knowledge base, including:
  - identifying one or more query tokens absent from the knowledge base; and
  - leveraging a neural network to predict a probability of a relationship between the query tokens absent from the knowledge base and one or more tokens populated in the knowledge base;
- translating the NL query to a structured query language (SQL), including selectively incorporating the query tokens absent from the knowledge base into the NL query responsive to the predicted probability;
- executing the SQL and evaluating validity of the executed SQL; and
- selectively and dynamically amending the knowledge base responsive to the validity evaluation.

12. The method of claim 11, wherein leveraging the neural network further comprises:
- creating a composite representation of the identified query tokens in a first layer of the neural network, concatenating an output vector for the identified query tokens, and ingesting the concatenated output vector at an adjacent layer of the neural network;
- assessing different token combinations in a second layer of the neural network; and
- identifying a probability of a relationship of the query tokens to one or more knowledge base tokens.

13. The method of claim 12, wherein executing the SQL generates a signal, and further comprising amending the one or more identified query tokens with signal metadata.

14. The method of claim 13, wherein evaluating validity of the executed SQL includes evaluating signal metadata, and wherein dynamically amending the knowledge base responsive to the validity evaluation includes selectively adding the identified query tokens to the knowledge base based on a corresponding value of the signal metadata, wherein the selectively added query tokens creates ground truth data.

15. The method of claim 14, further comprising re-training the neural network with the one or more selectively added query tokens, wherein output from the neural network generates a prediction corresponding to retaining the one or more selectively added tokens in the knowledge base.

16. The computer system of claim 1, wherein:
- the SQL manager is further configured to generate a signal from the executed SQL and amend the one or more identified query tokens with signal metadata; and
- the knowledge base manager is configured to selectively add the identified query tokens to the knowledge base based on a corresponding reward value of the signal metadata.

17. The computer program product of claim 6, further comprising program code executable by the processor to:
- generate a signal from the executed SQL;
- amend the one or more identified query tokens with signal metadata; and
- selectively add the identified query tokens to the knowledge base based on a corresponding reward value of the signal metadata.

* * * * *